3,283,000
NEUTRAL SULFATE SALTS OF TETRACYCLINES

Harold Mendelsohn, Nanuet, N.Y., assignor to American Cyanamid Company, Stamford, Conn., a corporation of Maine
No Drawing. Filed Oct. 9, 1964, Ser. No. 402,930
5 Claims. (Cl. 260—559)

This invention relates to novel salts of known antibiotics and to a process for the preparation of these salts. More particularly, this invention is concerned with three new compounds, tetracycline neutral sulfate $$[(C_{22}H_{25}N_2O_8)_2SO_4]$$

6-demethyltetracycline neutral sulfate $$[(C_{21}H_{23}N_2O_8)_2SO_4]$$

and 7-chloro-6-demethyltetracycline neutral sulfate $$[(C_{21}H_{22}N_2O_8Cl)_2SO_4]$$

One of the problems most difficult to overcome in the manufacture and distribution of antibiotics is the degree of instability of these compounds. The packaged products are shipped world wide and therefore have to undergo extensive changes in climate, and experience prolonged shelf-life. The concern over the instability of existing antibiotic products is evidenced by the fact that the United States Food and Drug Administration has, for many years, required expiration dates to be printed on the product labels of all antibiotic products. In some cases this expiration period is as little as one year.

The novel compounds of the present invention, wherein two moles of antibiotic are combined with one mole of sulfuric acid, have been found to be more stable than the commonly formed corresponding acid sulfates or the neutral forms. This prolonged stability of the neutral sulfate form of these antibiotics makes them more desirable for use in pharmaceutical preparations, particularly in the case of liquid preparations such as syrups, emulsions, ointments and pediatric preparations, most of which have only one or two year expiration periods due to poor stability experienced during normal shelf life.

The novel process for the preparation of the compounds of the present invention consists in first slurrying the neutral form of the antibiotic with acetone at 0° C. This slurry is then mixed with a sulfuric acid-acetone solution prepared by dissolving one molar equivalent of concentrated sulfuric acid per mole of neutral antibiotic in cold acetone. This mixture of sulfuric acid-acetone-neutral antibiotic is stirred for a period of time of from about 18 to about 32 hours, preferably about 24 hours, at room temperature and then filtered. The precipitate is washed with acetone and the crystalline product is then dried at room temperature.

The following table sets forth the increased stability of the neutral sulfate forms of the antibiotics of the present invention under normal and accelerated stability studies.

TABLE I

|  | 6-Demethyltetracycline Neutral Sulfate, percent | 6-Demethyltetracycline Acid Sulfate, percent |
|---|---|---|
| Initial Potency | 93.8 | 82.5 |
| Room Temperature, 2 months | 95.1 | 80.8 |
| Room Temperature, 4 months | 94.3 | 81.9 |
| Room Temperature, 8 months | 92.4 | 87.3 |
| Room Temperature, 12 months | 93.6 | 86.6 |
| 42° C.—2 months | 97.8 | 48.4 |
| 110° C.—16 hours | 87.9 | 80.5 |
| 56° C.—1 week | 92.7 | 54.9 |
| 70° C.—1 week | 95.3 | 26.2 |

The invention will be described in greater detail in conjunction with the following specific examples.

Example 1.—Preparation of 6-demethyltetracycline neutral sulfate

A chilled solution of 3.87 milliliters (1 mole equivalent) of concentrated (96.9%) sulfuric acid in 300 milliliters of cold acetone was prepared. A slurry was formed by mixing 60 grams of 6-demethyltetracycline neutral, assaying 1040 micrograms per milligram (equivalent to 62.4 grams real), in 1000 milliters of acetone at 0° C. The chilled sulfuric acid-acetone solution was added to the stirred 6-demethyltetracycline neutral-acetone slurry. This mixture was stirred overnight at room temperature and then filtered. The precipitate was washed with 200 milliliters of acetone followed by 100 milliliters of ethyl ether. The crystals were dried at room temperature yielding 62.0 grams of 6-demethyltetracycline neutral sulfate assaying 960 micrograms per milligram (spectrophotometric assay) and having a sulfate content of 10.25% by titration.

Example 2.—Preparation of 7-chloro-6-demethyltetracycline neutral sulfate

A chilled solution of 3.2 milliliters (1 mole equivalent) of concentrated (96.9%) sulfuric acid in 300 milliliters of acetone at −10° C. was prepared. A slurry was formed by mixing 50 grams of 7-chloro-6-demethyltetracycline neutral in 700 milliliters of cold (4° C.) acetone. The chilled sulfuric acid-acetone solution was added to the stirred 7-chloro-6-demethyltetracycline neutral-acetone slurry. This mixture was stirred for 5 hours at 30°–35° C. and then filtered. The precipitate was washed with one 300 milliliter portion of acetone followed by a washing with 200 milliliters of acetone. The crystals were dried in vacuo at 50° C. yielding 50.8 grams of 7-chloro-6-demethyltetracycline neutral sulfate, assaying 975 micrograms per milligram (spectrophotometric assay) and having a sulfate content of 10.4% by titration.

Example 3.—Preparation of tetracycline neutral sulfate

A chilled solution of 3.6 milliliters (1 mole equivalent) of concentrated (96%) sulfuric acid in 500 milliliters of acetone at −10° C. was prepared. A slurry was formed by mixing 62 grams of tetracycline neutral, assaying 1003 micrograms per milligram, in 700 milliliters of cold (4° C.) acetone. The chilled sulfuric acid-acetone solution was added to the stirred tetracycline neutral-acetone slurry. The mixture was stirred at 30° C. for 4 hours and then filtered. The precipitate was washed with 200 milliliters of acetone followed by 200 milliliters of ethyl ether. The crystals were dried in vacuo at 50° C. for 18 hours yielding 59.5 grams of tetracycline neutral sulfate, assaying 905 micrograms per milligram (spectrophotometric assay) and having a sulfate content of 10.7% by titration.

What is claimed is:

1. The compound 6-demethyltetracycline neutral sulfate having the empirical formula $(C_{21}H_{23}N_2O_8)_2SO_4$.

2. The compound 7-chloro-6-demethyltetracycline neutral sulfate having the empirical formula $$(C_{21}H_{22}N_2O_8Cl)_2SO_4$$

3. The process of preparing tetracycline neutral sulfate which comprises slurrying tetracycline in a solution of acetone having dissolved therein 1 equivalent of sulfuric acid per mole of tetracycline, stirring the resulting slurry at about room temperature for a period of time of from about 18 to about 32 hours, and recovering tetracycline neutral sulfate therefrom.

4. The process of preparing 6-demethyltetracycline neutral sulfate which comprises slurrying 6-demethyltetracycline in a solution of acetone having dissolved therein 1 equivalent of sulfuric acid per mole of 6-demethyltetracycline, stirring the resulting slurry at about room temperature for a period of time of from about 18 to about 32 hours, and recovering 6-demethyltetracycline neutral sulfate therefrom.

5. The process of preparing 7-chloro-6-demethyltetracycline neutral sulfate which comprises slurrying 7-chloro-6-demethyltetracycline in a solution of acetone having dissolved therein 1 equivalent of sulfuric acid per mole of 7-chloro-6-demethyltetracycline, stirring the resulting slurry at about room temperautre for a period of time of from about 18 to about 32 hours, and recovering 7-chloro-6-demethyltetracycline neutral sulfate therefrom.

References Cited by the Examiner
UNITED STATES PATENTS

| | | | |
|---|---|---|---|
| 2,699,054 | 1/1955 | Conover | 260—559 |
| 2,871,265 | 1/1959 | Reede et al. | 260—559 |
| 2,922,817 | 1/1960 | Green | 260—559 |

ALEX MAZEL, *Primary Examiner.*

JAMES W. ADAMS, JR., *Assistant Examiner.*